(12) United States Patent
Ward et al.

(10) Patent No.: US 7,862,686 B2
(45) Date of Patent: Jan. 4, 2011

(54) ENHANCED MULTI-PLY TISSUE PRODUCTS

(75) Inventors: Margaret M. Ward, Appleton, WI (US); Gary Shanklin, Fremont, WI (US); Cynthia W. Henderson, Neenah, WI (US); Michael Payne, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 12/708,748

(22) Filed: Feb. 19, 2010

(65) Prior Publication Data

US 2010/0147473 A1 Jun. 17, 2010

Related U.S. Application Data

(60) Division of application No. 12/396,085, filed on Mar. 2, 2009, now Pat. No. 7,699,959, which is a continuation of application No. 10/928,412, filed on Aug. 27, 2004, now Pat. No. 7,497,923, which is a division of application No. 09/712,808, filed on Nov. 14, 2000, now abandoned.

(51) Int. Cl.
*D21F 11/00* (2006.01)

(52) U.S. Cl. .................. 162/123; 162/124; 162/125; 162/132; 428/152; 428/195

(58) Field of Classification Search .............. 162/123, 162/124, 125, 132; 428/152, 154, 195
See application file for complete search history.

(56) References Cited

U.S. PATENT DOCUMENTS

| | | | |
|---|---|---|---|
| 3,556,932 A | 1/1971 | Coscia et al. | |
| 3,556,933 A | 1/1971 | Williams et al. | |
| 3,650,882 A * | 3/1972 | Thomas | 428/154 |
| 3,687,797 A * | 8/1972 | Wideman | 428/154 |
| 3,700,623 A | 10/1972 | Kelm | |
| 3,772,076 A | 11/1973 | Keim | |
| 3,837,995 A | 9/1974 | Floden | |
| 3,885,158 A | 5/1975 | Flutie et al. | |
| 3,899,388 A | 8/1975 | Petrovich et al. | |
| 3,940,529 A | 2/1976 | Hepford et al. | |
| 3,952,124 A | 4/1976 | Mesek | |
| 3,953,638 A * | 4/1976 | Kemp | 428/154 |
| 3,994,771 A | 11/1976 | Morgan, Jr. et al. | |
| 4,100,017 A | 7/1978 | Flautt, Jr. | |
| 4,100,324 A | 7/1978 | Anderson et al. | |
| 4,129,528 A | 12/1978 | Petrovich et al. | |
| 4,147,586 A | 4/1979 | Petrovich et al. | |
| 4,222,921 A | 9/1980 | Van Eenam | |
| 4,276,338 A | 6/1981 | Ludwa et al. | |
| 4,300,981 A | 11/1981 | Carstens | |
| 4,355,021 A | 10/1982 | Mahl et al. | |
| 4,426,417 A | 1/1984 | Meitner et al. | |
| 4,426,418 A | 1/1984 | Coleman et al. | |
| 4,489,118 A | 12/1984 | Endres et al. | |
| 4,507,351 A | 3/1985 | Johnson et al. | |
| 4,529,840 A | 7/1985 | Colton et al. | |
| 4,574,021 A | 3/1986 | Endres et al. | |
| 4,637,859 A | 1/1987 | Trokhan | |
| 4,675,394 A | 6/1987 | Solarek et al. | |
| 4,738,847 A | 4/1988 | Rothe et al. | |
| 4,764,418 A | 8/1988 | Kuenn et al. | |
| 4,828,912 A | 5/1989 | Hossain et al. | |
| 4,919,877 A | 4/1990 | Parsons et al. | |
| 4,975,217 A | 12/1990 | Brown-Skrobot et al. | |
| 4,981,557 A | 1/1991 | Bjorkquist | |
| 5,008,344 A | 4/1991 | Bjorkquist | |
| 5,048,589 A | 9/1991 | Cook et al. | |
| 5,069,548 A | 12/1991 | Boehnlein | |
| 5,079,004 A | 1/1992 | Blank et al. | |
| 5,085,736 A | 2/1992 | Bjorkquist | |
| 5,087,324 A | 2/1992 | Awofeso et al. | |
| 5,129,988 A | 7/1992 | Farrington | |
| 5,180,471 A | 1/1993 | Sauer et al. | |
| 5,324,561 A | 6/1994 | Rezai et al. | |
| 5,324,575 A | 6/1994 | Sultze et al. | |
| 5,336,373 A | 8/1994 | Scattolino et al. | |
| 5,350,624 A | 9/1994 | Georger et al. | |
| 5,372,877 A | 12/1994 | Kannankeril | |
| 5,397,435 A | 3/1995 | Ostendorf et al. | |
| 5,409,572 A | 4/1995 | Kershaw et al. | |
| 5,429,686 A | 7/1995 | Chiu et al. | |
| 5,437,908 A | 8/1995 | Demura et al. | |
| 5,494,554 A | 2/1996 | Edwards et al. | |

(Continued)

FOREIGN PATENT DOCUMENTS

| | | |
|---|---|---|
| CA | 2241820 | 2/1999 |
| EP | 0566755 A1 | 10/1993 |
| EP | 0677612 A2 | 10/1995 |
| EP | 0696344 B1 | 2/1996 |
| EP | 0688152 B1 | 8/1996 |
| EP | 0739708 A2 | 10/1996 |
| EP | 0631014 B1 | 10/1997 |
| EP | 1149552 A1 | 10/2001 |
| WO | WO 9500706 | 1/1995 |
| WO | WO 9945771 | 9/1999 |
| WO | WO 0004938 A1 | 2/2000 |

OTHER PUBLICATIONS

Webster's New World Dictionary, 1966, pp. 1126-1127.

*Primary Examiner*—Mark Halpern
(74) *Attorney, Agent, or Firm*—Dority & Manning, P.A.

(57) ABSTRACT

Tissues are provided as multi-ply tissue products having greater tactile sensation and resiliency in hand. Improved tissues may have a thickened and reduced density middle layer. The tissues may serve as applicators for chemical agents to be released during use of the tissue. A tissue having an improved tactile impression to the consumer, with enhanced resilience and high external bulk is disclosed. In one embodiment, a multi-ply structure having at least three plies is desirable. A middle or intermediate ply is comprised an increased thickness and a greater bulk is employed. In general, the exterior plies of the tissue are smooth and desirable to the consumer.

14 Claims, 3 Drawing Sheets

U.S. PATENT DOCUMENTS

| | | |
|---|---|---|
| 5,506,035 A | 4/1996 | Van Phan et al. |
| 5,529,665 A | 6/1996 | Kaun |
| 5,534,165 A | 7/1996 | Pilosof et al. |
| 5,556,509 A | 9/1996 | Trokhan et al. |
| 5,652,194 A | 7/1997 | Dyer et al. |
| 5,656,132 A | 8/1997 | Farrington, Jr. et al. |
| 5,656,134 A | 8/1997 | Marinack et al. |
| 5,672,248 A | 9/1997 | Wendt et al. |
| 5,685,954 A | 11/1997 | Marinack et al. |
| 5,690,788 A | 11/1997 | Marinack et al. |
| 5,693,406 A | 12/1997 | Wegele et al. |
| 5,709,775 A | 1/1998 | Trokhan et al. |
| 5,776,312 A | 7/1998 | Trokhan et al. |
| 5,779,860 A | 7/1998 | Hollenberg et al. |
| 5,795,921 A | 8/1998 | Dyer et al. |
| 5,814,190 A | 9/1998 | Van Phan |
| 5,830,558 A | 11/1998 | Barnholtz |
| 5,837,103 A | 11/1998 | Trokhan et al. |
| 5,846,379 A | 12/1998 | Ampulski et al. |
| 5,846,636 A | 12/1998 | Ruppel et al. |
| 5,871,887 A | 2/1999 | Trokhan et al. |
| 5,885,415 A | 3/1999 | Marinack et al. |
| 5,885,417 A | 3/1999 | Marinack et al. |
| 5,904,812 A | 5/1999 | Salman et al. |
| 5,904,971 A | 5/1999 | Anderson et al. |
| 5,906,711 A | 5/1999 | Barnholtz |
| 5,919,556 A | 7/1999 | Barnholtz |
| 5,935,383 A | 8/1999 | Sun et al. |
| 5,980,673 A | 11/1999 | Takeuchi et al. |
| 5,990,377 A * | 11/1999 | Chen et al. .................. 604/381 |
| 6,080,279 A | 6/2000 | Hada et al. |
| 6,083,346 A | 7/2000 | Hermans et al. |
| 6,096,169 A | 8/2000 | Hermans et al. |
| 6,120,642 A | 9/2000 | Lindsay et al. |
| 6,129,815 A | 10/2000 | Larson et al. |
| 6,136,422 A | 10/2000 | Lichtenberg et al. |
| 6,143,135 A | 11/2000 | Hada et al. |
| 6,165,585 A | 12/2000 | Trokhan |
| 6,171,442 B1 | 1/2001 | Farington et al. |
| 6,197,154 B1 | 3/2001 | Chen et al. |
| 6,277,241 B1 | 8/2001 | Merker et al. |
| 6,649,025 B2 | 11/2003 | Mills et al. |
| 2002/0060000 A1 | 5/2002 | Du Grosriez et al. |

* cited by examiner

ENHANCED MULTI-PLY TISSUE PRODUCTS

RELATED APPLICATIONS

The present application is a divisional application and claims priority to U.S. patent application Ser. No. 12/396,085, filed on Mar. 2, 2009, which is a continuation application and claims priority to U.S. patent application Ser. No. 10/928,412, filed on Aug. 27, 2004, which issued as U.S. Pat. No. 7,497,923 on Mar. 3, 2009, which is a divisional application and claims priority to U.S. patent application Ser. No. 09/712,808 filed on Nov. 14, 2000 and now abandoned. The disclosures of which are incorporated herein by reference.

BACKGROUND OF THE INVENTION

Absorbent products such as paper towels, industrial wipers, baby wipers, tissue, food service wipers, and the like are designed to provide several important properties. For example, the products should have good bulk characteristics and a soft feel. The products should be highly absorbent to fluids, including bodily fluids. In many cases, the products need good strength even after they become wet. Some products require a high resistance to tearing. Small changes in the structure or manufacturing processes of such products can provide a profound impact on the ultimate sensation to the user. Attempts have been made in the past to enhance and increase the physical characteristics of multi-ply tissue products.

One advantage of providing a multi-ply product as opposed to a single ply product is that different plies may provide different properties to the overall product. For example, disposable absorbent articles such as diapers may have a permeable first ply such as a liner in a diaper, an absorbent middle ply such as an absorbent core, and an impermeable outer ply such as a cover or backsheet. In contrast to diaper products, tissue products customarily have comprised two or three permeable plies of material. Some of the most popular tissue products on the market today include multiple plies for enhanced softness and thickness. For example, some of the premium tissues currently sold in the United States have three plies, all of which generally are structurally equivalent and equally permeable. That is, in many tissues multiple plies are provided which are essentially the same and are combined together to form a single multi-ply tissue. Typically, tissues in the prior art have plies that are structurally similar. However, some tissue products are known to have existed with heterogeneous (dissimilar) plies. Heterogeneous plies are used to accomplish several objectives in the tissue industry, such as, enhancement of strength without a reduction in softness. In some cases, heterogeneous plies can provide a mechanism to bury or separate potentially harsh or irritating substances into the center of the tissue, thereby preventing irritation to the user at the surface of the tissue. See, for example, U.S. Pat. No. 4,738,847 to Rothe et al. In some cases, a multi-ply structure has been used to provide an absorbent core in the center of the tissue, such as provided in U.S. Pat. No. 5,437,908 (Demura et al.).

At least one known disclosure is directed to forming a tissue product or laminate from two dissimilar paper webs. See U.S. Pat. No. 4,100,017 (Flautt, Jr.). The Flautt patent describes a web of low density, high bulk process paper united with a web of conventional paper. Variations described in the Flautt disclosure include using two paper webs having different creping characteristics to form the laminated sanitary tissue. It is quite possible that such a structure would be useful for an end product such as a paper towel.

Several recent United States patents disclose multi-ply tissues in which a ply includes relatively low density regions dispersed throughout a relatively high density continuous network. See U.S. Pat. Nos. 5,830,558; 5,906,711; and 5,919,556 each issued on behalf of inventor Steven Lee Barnholtz. The stated goal of such heterogeneous tissues is increased absorbency. Barnholtz discloses a three ply tissue structure in which a center or middle ply comprises a more dense, thinner ply. See for example FIGS. 2A and 2B of each patent. The center ply is thinner than the outer plies, and it is generally more compact and more dense than the outer plies. See U.S. Pat. No. 5,906,711; column 9, lines 28-36.

One problem with tissues having a thin, dense and compact middle ply is that such tissues tend to lack the superior softness that is desired by consumers. Further, the bulk and resiliency of tissues having a thin and dense middle ply is less than desirable. A thin, dense middle ply does not provide the smooth, bulky, resilient feel that consumers prefer in tissues of this type.

What is needed in the industry is a multi-ply paper product or tissue that is durable and soft having increased resiliency and enhanced substance in hand. Further, a tissue with a thicker middle ply, and a less dense (i.e. more bulky) middle ply is desirable. Furthermore, it is highly desirable to provide a product having multiple plies in which middle plies of the tissue are structurally or chemically enhanced to improve products functional performance, e.g. doesn't tear, shred or fall apart in use. A strong tissue that is also soft would be a substantial improvement over the art. Higher bulk, less dense and thicker middle layers provide advantages to the overall feel of tissues. Further, it would be desirable to find a way to store a substance within a tissue, and then enable release of the substance at a later time.

SUMMARY OF THE INVENTION

In one embodiment of the invention there is provided a tissue having superior tactile properties and greater bulk characteristics. Surprisingly, it has been discovered that certain mechanical or chemical modifications to individual plies within a multi-ply tissue can lead to improved tissues having greater bulk and tactile effects to the user. A tissue having a thickened middle ply with less density and greater bulk is disclosed.

A method of manufacturing a tissue having three plies with chemical enhancement is another embodiment of the invention. At least one embodiment comprises a multi-ply tissue comprising a plurality of plies wherein one ply is structurally different from at least one of the other plies. In many cases, the tissue will be manufactured using conventional tissue manufacturing technology as further described below.

In one embodiment the invention comprises a tissue having three plies, comprising a sandwich-type structure having a permeable first outer ply, a middle ply lying adjacent the outer ply and a second outer ply, the second outer ply lying adjacent the middle ply. In the tissue, the middle ply is thickened as compared to the outer plies. Further, in some embodiments, the middle ply provides enhanced tactile sensation in the composite tissue structure. Thus, the tissue may be more bulky, soft, or fragrant, or may impart other chemical advantages to the user, depending upon how the tissue is treated in subsequent steps. Further, the tissue has a less dense, fluffed or more highly bulked middle ply in some embodiments.

In other embodiments, the tissue may include chemical alterations associated with the thickened middle ply. In one embodiment, a thickened middle ply may be provided which comprises secondary fiber, Coform or curled fibers. In other embodiments, the middle plies contain activated carbon or foam. Many different materials may be provided in the middle ply to increase bulk and reduce the density of the tissue, facilitating increased absorbency, resulting in a more substantial and resilient tissue product. In one embodiment, the tissue of the middle ply comprises a foam. In other embodiments, the tissue may include chemical alterations, further wherein the chemical alterations are effected by spraying, printing, embossing, dipping or the like on one or more plies. In one embodiment, chemical alterations during basesheet manufacturing such as wet end addition, or creping additives or by spraying the web on the felt, to one or more plies is provided.

In one aspect of the invention, a tissue having three plies is disclosed and claimed. The three ply tissue has in this instance a permeable first outer ply, a middle ply, and a second outer ply, the second outer ply lying adjacent the middle ply, wherein the middle ply is between the first outer ply and the second outer ply. A three ply "sandwich" is formed, and the middle ply can be modified in any number of ways to provide more substantial effects to the consumer. The first outer ply, middle ply, and second outer plies are joined to form a tissue having enhanced softness or thickness. Further, the tissue has at least one ply that is chemically enhanced. For example, one method of such enhancement is by applying activated carbon, and another method involves the application of foam.

In one embodiment, a tissue wherein at least one ply is treated with a tissue enhancer is shown. By tissue enhancer, we mean to refer to either a chemical or mechanical treatment of the tissue in one of several methods or procedures as described herein, including, for example foam or activated carbon application, or chemical carrying capability. Chemical enhancement refers to a chemical treatment of a tissue using a chemical composition. Each of these enhancers may provide a unique property to the tissue. In some cases, the tissue additionally comprises an antibacterial or antiviral agent which kills or slows the reproduction of bacteria and viruses and thereby promotes the health of tissue users.

The tissues of this invention can provide a multi-ply tissue having at least three plies in which the plies that do not comprise an outwardly facing surface of the tissue structure may be composed of relatively coarser material versus the outer plies which are relatively smoother. In some embodiments, the tissue has a middle ply which is noncreped or mechanically altered by various means to provide a thicker tissue.

In some cases, it may be possible to provide plies of tissue that act as chemical carriers, which may transport a chemical substance to a user. Chemical carriers are carried by the plies, and then can be released from the tissue to the user during use. In one aspect of the invention, a soft, multi-ply tissue with smooth outer surfaces and a bulky middle is provided to the user which provides a tactile impression of substance and resilience to the user. Some embodiments of the invention will provide to the user improved fluid absorbency and fluid retention properties.

BRIEF DESCRIPTION OF THE DRAWINGS

A full and enabling disclosure of this invention, including the best mode known to one of ordinary skill in the art, is set forth in the remainder of this specification. The following Figures illustrate the advantages of this invention.

DETAILED DESCRIPTION OF THE INVENTION

It is known that the addition of a third ply to a facial tissue composite structure can provide enhanced softness. In one invention of this application a composite structure is provided with modified plies that enhances the substance and resiliency of the multi ply tissue product. A thickened middle ply having less density and greater bulk is desirable.

Figure 1:
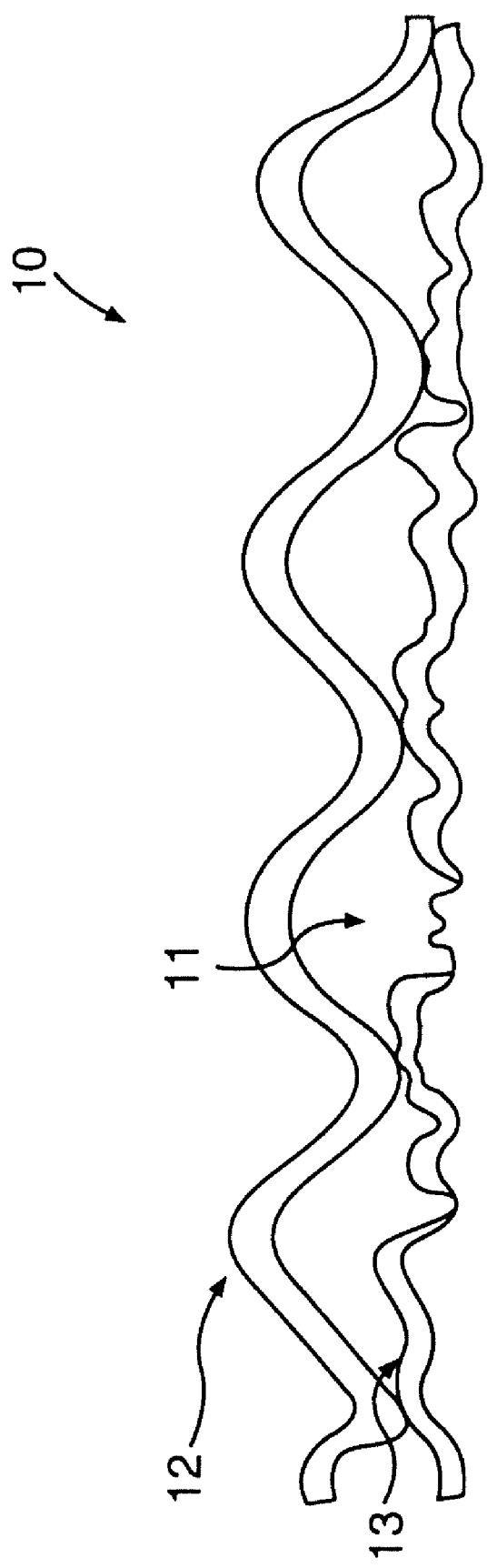
FIG. 1 is a diagram showing a typical prior art tissue configuration having two dissimilar paper webs combined together.

As seen in the prior art shown in FIG. 1, known methods of producing sanitary tissue products include providing laminates formed from two dissimilar paper webs. When a web of low density, high bulk process paper is united with a web of conventional paper, a product having absorbency, softness, flexibility and bulk properties can be achieved. In the prior art, it is known to provide two dissimilar paper webs having different creping characteristics to form the laminated sanitary tissue. In FIG. 1, such a multi-ply tissue product 10 is shown comprising a high bulk process paper 12 and conventional paper 13. The two plies are combined to form a multi-ply tissue in such a way that void spaces 11 exist between the two plies. The void spaces provide a tissue with more bulk.

Figure 2:
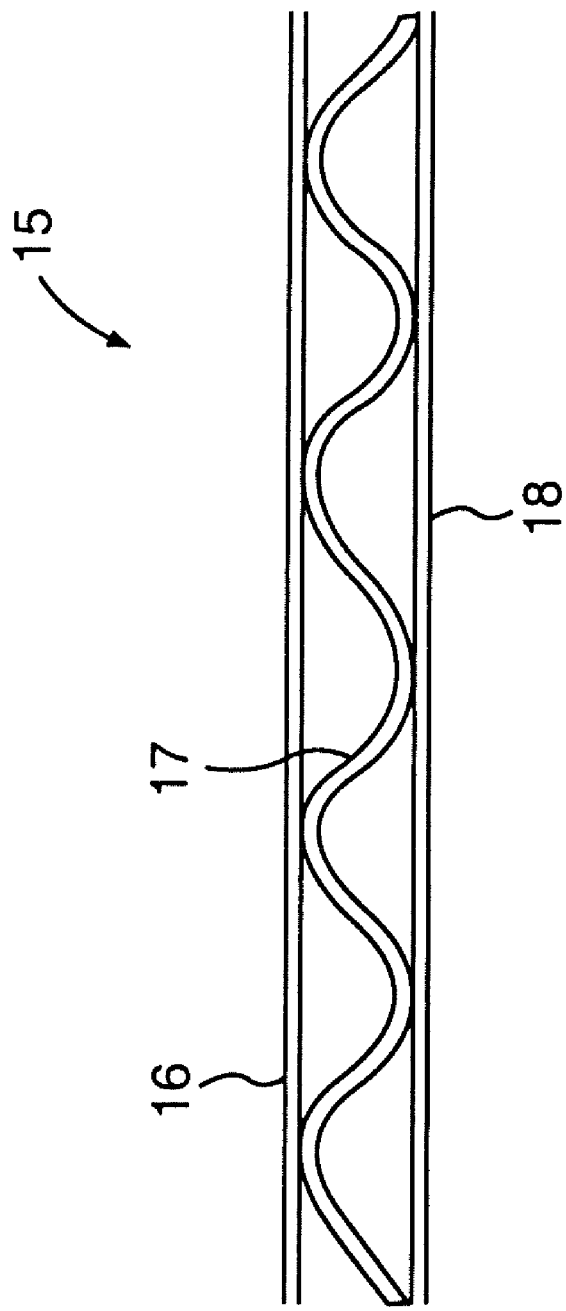
FIG. 2 shows a preferred embodiment of this invention including a three ply tissue structure with smooth tissue plies on the exterior sides of the tissue and a thickened, bulky ply on the interior of the tissue.

FIG. 2 shows one embodiment of this invention. In that Figure, a soft multi-ply tissue with smooth outer surfaces providing a tactile impression of substance and resilience is shown. A middle layer that is thickened is provided, in which the middle layer of this particular embodiment is provided in a corrugated or ridged pattern for enhanced bulk and thickness. The middle ply provides increased bulk and thickness. The combination of smoothness and substance is obtained from a multi-ply structure that comprises at least three plies in the preferred embodiment. The outer surfaces typically are smooth, soft tissue, such as produced by wet pressed tissue making processes (described below).

In FIG. 2, improved multi-ply tissue 15 is shown. The improved multi-ply tissue is comprised of first outer ply 16 and second outer ply 18. Sandwiched between the plies 16 and 18 (which are smooth tissue plies) is a thickened middle tissue ply 17, that may be textured. The middle ply 17 provides a less dense, higher caliper ply as compared to the outer plies. In one embodiment, the middle ply is at least 1.3 times greater in thickness or caliper than either of the outer plies.

For purposes of this specification, the caliper is generally the thickness of a single sheet, but measured as the thickness of a stack of 10 sheets and dividing the ten-sheet thickness by 10, wherein each sheet in the stack is placed with the same side up. Caliper is usually expressed in microns. Caliper is measured in accordance with TAPPI test methods T402 "Standard Conditioning and Testing Atmosphere for Paper, Board, Pulp Handsheets and Related Products" which is used by persons of skill in the art of tissue making. Additionally, T411 om-89 "Thickness (caliper) of Paper, Paperboard, and Combined Board" with Note 3 is used to measure Caliper for stacked sheets. Further, the micrometer used for carrying out the T411 om-89 tests is a Bulk Micrometer (Emveco Model 200-A, Newberg, Oreg.) having an anvil diameter of 2.221 inches (56.42 millimeters) and an anvil pressure of 132 grams/square inch (2.00 kiloPascals). After the Caliper is measured, the same ten sheets in the stack are used to determine the average basis weight of the sheets.

The bulk of the tissue products of this invention is calculated as the quotient of the Caliper (expressed in microns) divided by the basis weight, expressed in grams per square meter. The resulting Bulk is expressed as cubic centimeters per gram.

Geometric mean tensile strength (GMT) is the square root of the product of the machine direction tensile strength and the cross-machine direction tensile strength. Tensile strength is measured with an Instron tensile tester using a 3 inches jaw width, a 4 inches jaw span, and a crosshead speed of 10 inches per minute. For example, in U.S. Pat. No. 5,935,383, entitled "Method for Improved Wet Strength Paper", measurements are taken in conditions consisting of 50% relative humidity and 72 degrees Fahrenheit for at least 24 hours, with the tensile test run at a crosshead speed of 1 in/min. GMT can be computed from the peak load values of the machine direction (MD) and cross machine direction (CD) tensile curves. These values are obtained under laboratory conditions of 23.0+/−1.0 degrees Celsius and 50.0+/−2.0 percent relative humidity after the sheet (of tissue) has been equilibrated to the testing conditions for a period of not less than four hours.

In the tissue shown in FIG. 2, the middle ply may be a flexible, textured, high bulk relative to the outer plies, resilient, may be textured rather than smooth. The finished tissue in one embodiment has a flexible corrugated structure while still providing surface smoothness. A tissue of this type has the ability to "glide" on the skin, while at the same time providing a high degree of substance in hand and resiliency. The tissue of this type generally has better fluid absorbency and fluid retention properties than prior art tissues.

In one embodiment, the textured tissue comprises a middle ply with a high degree of external bulk created by a corrugated or ridged structure as further shown in FIG. 2. In that way, the tissue may exhibit a high degree of bulk and a high degree of flexibility. Thus, the tissues are bulky, yet not stiff. Since the textured tissue is plied between two smooth tissue plies, the surface feel of the textured tissue is not as critical to the overall performance of the tissue.

Modified wet pressed tissue (also known as MWP) is similar to wet pressed tissue except that dewatering is accomplished with an air press and the tissue is pressed to the Yankee with a fabric rather than with a felt. MWP processes are known to persons of skill in the art, and U.S. Pat. Nos. 6,083,346; 6,096,169; and 6,080,279 are hereby incorporated by reference. MWP type tissues could be employed in the application of this invention. The web is pressed onto the Yankee with a fabric, so the tissue contacts the Yankee only at the fabric knuckles. In that way, the three dimensional structure is preserved. In general, MWP tissues are bulkier than wet pressed tissues.

Paper products prepared from an uncreped through-air drying process will typically possess relatively high levels of absorbent capacity, softness and caliper. In addition, because the process avoids the use of costly creping steps, tissues produced according to this process will generally be more economical to produce than creped tissues of similar composition and basis weight.

In conventional felted wet pressed tissue making processes, the wet tissue web is carried on a felt to the Yankee dryer. The felt and tissue web are pressed on the Yankee dryer to de-water the tissue web and adhere it to the Yankee dryer. The Yankee dryer completes the drying process and the tissue is creped from the Yankee surface using a doctor blade or other suitable device. See, for example, U.S. Pat. Nos. 3,953,638; 5,324,575; 5,656,134; 5,685,954; and 5,690,788 which are each hereby incorporated by reference in their entirety as if fully set forth herein.

A process that produces a noncompressed sheet using can drying which may be employed in the present invention is described in U.S. Pat. No. 5,336,373 to Scattolino et al., which is incorporated herein by reference.

Suitable textured tissue base sheets can also include embossed, microembossed, and microstrained base sheets. Various techniques for embossing tissues are provided in U.S. Pat. No. 5,409,572 (Kershaw et al) and U.S. Pat. No. 5,693,406 (Wegele et al), each of which are incorporated by reference into this specification. Additional prior art tissue structures include tissues described in the following U.S. Pat Nos. 5,556,509; 5,709,775; 5,776,312; 5,837,103; 5,871,887; 4,637,859; 4,529,840; 5,814,190; 5,846,379; 5,685,954; 5,690,788; 5,885,415; and 5,885,417. The specification and claims of these patents are incorporated into this specification by reference.

Processes for forming uncreped through-air dried webs are described in U.S. Pat. Nos. 5,779,860 to Hollenberg et al. and 5,048,589 to Cook et al., both of which are assigned to the assignee of this invention and both of which are incorporated herein by reference. In such processes, through air drying is employed as shown in the Figures of Cook. As described and shown in Cook, a web is prepared by: (1) forming a furnish of cellulosic fibers, water, and a chemical debonder; (2) depositing the furnish on a traveling foraminous belt, thereby forming a fibrous web on top of the traveling foraminous belt; (3) subjecting the fibrous web to noncompressive drying to remove water from the fibrous web; and (4) removing the dried fibrous web from the traveling foraminous belt. The process described in Cook does not include creping and is referred to as an uncreped through-air drying process.

In general, the preferred basis weights of products range from about 5 to about 10 pound/2880 ft$^2$ per ply, yielding a finished basis weight for the structure of from about 15 to about 30 pound/2880 ft$^2$. In some embodiments, the composite structure additionally may be treated with compositions which transfer to the skin during use to promote skin health.

There are several advantages to paper structures shown in this patent application. For example, tissue products with heterogeneous plies as shown in the invention of this application enhance the strength of the tissue without reducing the softness. Further, potentially harsh or irritating substances may be disguised or buried in the center of the tissue in order to provide a benefit to the user that may otherwise be perceived as an irritating substance.

Virucidal agents may be employed in this invention, and examples of such agents and their application are provided in one or more of the following U.S. patents which are incorporated by reference into this application: U.S. Pat. No. 4,355,021 (Mahl et al); U.S. Pat. No. 4,764,418 (Kuenn et al); U.S. Pat. No. 4,828,912 (Hossain et al); U.S. Pat. No. 4,975,217 (Brown-Skrobot et al); and U.S. Pat. No. 4,738,847 (Rothe et al).

Thus, "UCTAD" refers to uncreped through air dried tissue. The tissue is dried by blowing hot air through the web, rather than by contact with a Yankee dryer. Stretch is imparted to the tissue by means of a rush transfer rather than by creping. It produces a bulkier tissue than conventional wet pressed (CWP) processes, in most cases. Two references describing the UCTAD process which are hereby incorporated by reference include EP 0 677 612 A2 (Wendt et al) and EP 0 631 014 B1 (Farrington, Jr. at al.).

In many cases, it is possible to increase the basis weight of the tissues in an attempt to increase the tactile impression of substance. However, increasing the basis weight of webs sometimes provides little improvement in the tactile impression of substance at the cost of increased stiffness of the tissue.

Textured tissue webs, especially those produced by the UCTAD, MWP yield a tissue with a significant tactile impression of substance and resilience. The structure of these webs tends to be defined by a plurality of dome-like structures, in some cases. In some embodiments, the structure is a corrugated-like or ridged middle ply having increased caliper or thickness, and greater bulk. These structures provide a large amount of external bulk to the overall tissue, with low stiffness. Reduced or diminished stiffness is a significant advantage in tissues. In this invention, by placing a ply of the above described textured base sheet between two plies of smooth soft base sheet, a tissue sandwich with a smooth surface and tactile impression of substance and resilience may be produced. Such a tissue is a significant advance over the prior art tissues.

There are generally at least two means of achieving a middle ply and surface enhancement. One means is by structural modifications of the tissue, and the other means is by chemical means. One embodiment of this invention shows a permeable first outer ply, an absorbent middle ply and a permeable second outer ply. Thus, a tissue product may be produced having in essence the same structure but two permeable plies instead of one.

Current tissue products with enhanced softness such as the Kleenex® ColdCare® product line have multiple plies which are generally structurally equivalent to each other.[1] Current prior art includes methods of treating the outer two plies topically. In some cases, a softer thicker tissue can be achieved in this invention by creating a thicker middle ply, wherein the thicker middle may be comprised of a secondary fiber. Secondary fibers are advantageous for middle plies because they are relatively inexpensive. U.S. Pat. No. 5,350,624 describes secondary fibers and how they may be used, and that patent is hereby incorporated by reference into this disclosure. Further, since the middle ply does not contact the skin of the user, inexpensive materials are not a disadvantage when such a multi-ply structure is used. In many cases, a softer and thicker tissue can be achieved by producing a ply comprised partly or entirely of foam. The preferred foam in that embodiment would be a polymeric foam such as may be provided in sheet form. The sheet or sheets could be from about 0.01 to about 1 cm in thickness. The sheets could be perforated or slit, either to enhance absorption.

ColdCare® and Kleenex® are registered trademarks of the Kimberly-Clark Corporation.

Suitable absorbent foams may be provided using high internal phase emulsions ("HIPE"), such as that described in U.S. Pat. No. 5,795,921 to Dyer et al. Further, crosslinked polyurethane foams also could be employed in the practice of the invention.

Additionally, activated carbon also could be employed in one or more layers of the tissue. In particular, activated carbon may be advantageously applied to the middle layer. Activated carbon or activated charcoal is available from commercial sources under trade names such as Calgon CPG®, PCB®, Type SLG®, Type CAL®, and Type OL®, each of which is available from the Calgon Carbon Corporation.

In some cases, it is possible to use Coform as a middle ply to increase the overall substance and absorbency in the tissue. "Coform" refers generally to web plies produced as described below. When coformed web plies are utilized, the coforming techniques disclosed in U.S. Pat. No. 4,100,324 to Anderson et al., which is incorporated by reference, may be used.

A coformed nonwoven web is formed by combining in a gas stream a mixture of meltblown thermoplastic and other fibers such as wood pulp or staple fibers. In the technique of making Coform, the thermoplastic and other fibers are combined prior to the combined fibers being collected on a forming wire to form a coherent web of randomly dispersed fibers. A typical coformed nonwoven web may comprise about 65% by weight cellulosic fibers and about 35% by weight thermoplastic fibers, although this ratio may be varied to achieve various desirable properties in such coformed webs. When the present resulting laminate is formed, the laminate may comprise about 50% by weight synthetic fibers and about 50% by weight cellulosic fibers, with other ratios also being suitable.

The basesheet of the tissue formed using Corform has high integrity and absorbency. Another reference describing products and processes of this type which use a textile staple fiber are shown in U.S. Pat. No. 4,426,417 (incorporated by reference) issued to Meitner et al.

Calendering is a commonly used practice of pressing webs press rolls arranged successively. The term "calender" refers to a process for producing fabrics, nonwoven webs, tissue, paper and the like that reduces the caliper, or thickness, of such web and imparts surface effects. Such surface effects may be increased gloss or smoothness. In general, the process of calendering includes passing the web through two or more heavy rollers which are sometimes heated.

As persons of skill in the art will be aware, numerous conventional methods or techniques exist for embossing or calendering the tissue. For example, EP 0 566 755 A1 and EP 0739 708 A2 (incorporated by reference) describe embossing techniques in general, and also wall angle of female embossing elements to achieve better pattern definition and higher bulk. Further, EP 0688 152 B1 (incorporated by reference) describes conventional techniques of microembossing. U.S. Pat. No. 5,904,812 (incorporated by reference) to Salman et al describes techniques of processing the web by consecutively calendering and embossing.

Chemical modifications to the middle plies or to adjacent surfaces of the outer plies surfaces may be performed in many ways. Various chemical modifications include spraying, printing, wet-end addition and embossing.

Figure 3:
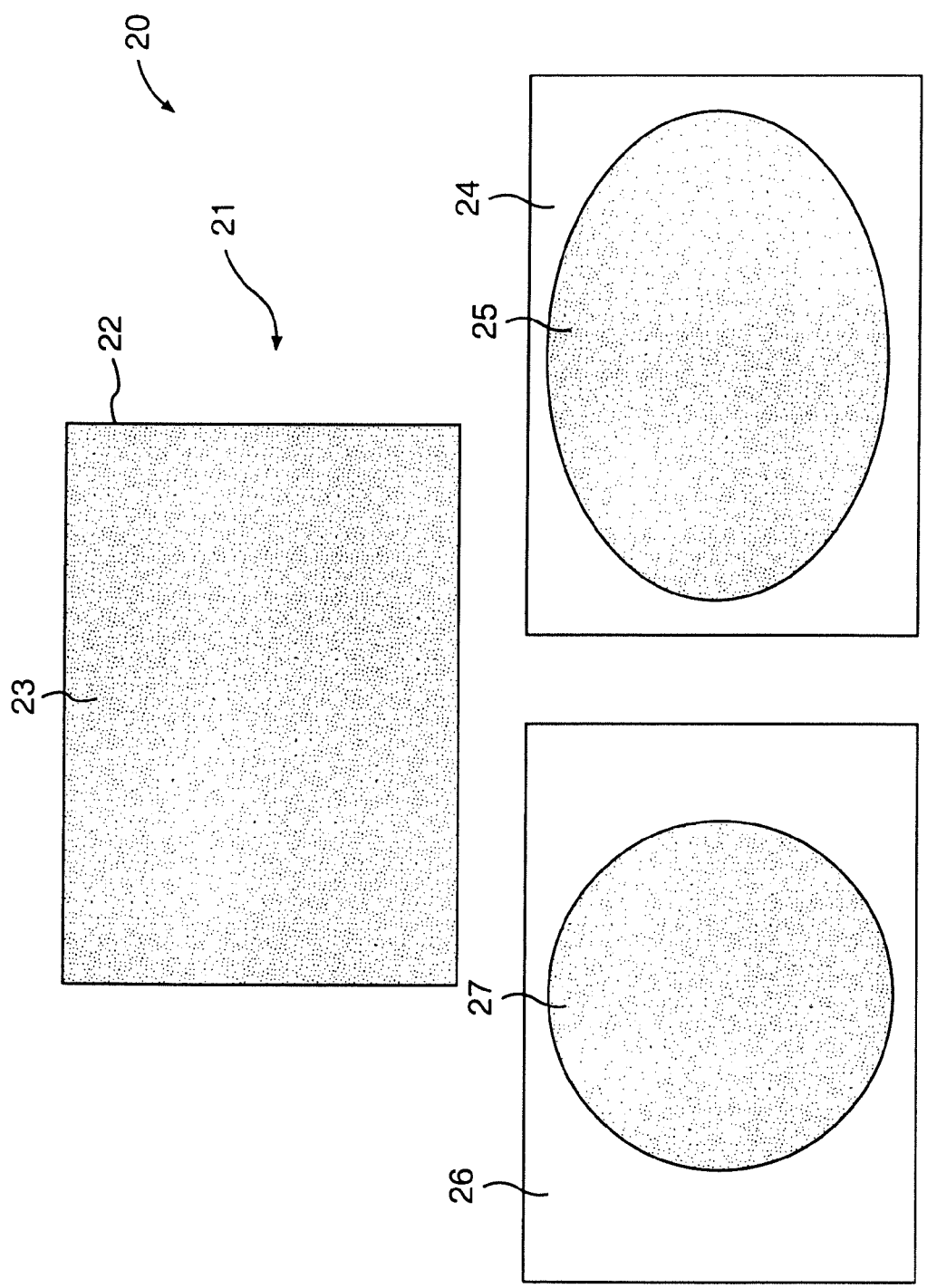
FIG. 3 depicts several variations showing the application of a chemical substance to a selected portion of a tissue.

FIG. 3 shows various ways that chemical modifications could be provided. Chemically modified tissues 20 are shown. Chemically modified tissue 21 includes a uniform and even distribution of chemical substance to the tissue 23. It can be seen in FIG. 3 that in this instance the chemical modification extends all the way to the tissue perimeter 22. Chemically modified tissue 24, on the other hand, contains a chemical modification applied only to the center portion of the tissue as seen in elliptical zone 25. A further example is seen in chemically modified tissue 26, which contains a circular zone 27.

Furthermore, other methods of application could include discreet modified zones, or other patterns such as stripes, dots, corrugated patterns and the like.

EXAMPLES

The following description of conventional wet pressed tissue, MWP, and UCTAD techniques are summarized and incorporated into several of the following examples.

Conventional Wet Pressed Tissue ("CWP")

In a typical application of the invention, a low consistency pulp furnish is provided in a pressurized headbox. The headbox has an opening for delivering a thin deposit of pulp furnish onto a foraminous forming fabric to form a wet web.

The web is then typically dewatered to a fiber consistency of between about 7% and about 25% (total web weight basis) by vacuum dewatering and further dried by pressing operations wherein the web is subjected to pressure developed by opposing mechanical members such as, cylindrical rolls. The dewatered web is then further pressed and dried by a stream drum apparatus known in the art as a Yankee dryer. Pressure can be developed at the Yankee dryer by mechanical means such as an opposing cylindrical drum pressing against the web. The web is generally carried on a smooth felt as it is pressed between the pressing cylinder and the Yankee dryer, resulting in substantially uniform compression. The web is adhered to the Yankee dryer by compressional forces and adhesive. When the web is dry it is scraped from the Yankee dryer with a doctor blade in a process known in the art as creping. Creping foreshortens and softens the resulting web. Conventional wet pressed ("CWP") webs are considered to be compacted since the web is subjected to substantial mechanical compressional forces while the fibers are moist and are then dried and creped while in a compressed state.

Conventional wet pressed tissue plies used in the following examples showed a basis weight of about 7.5 lbs/2880 ft$^2$ and a geometric mean tensile of about 850 grams/3-inches (measured as three plies).

MWP

"MWP" refers to a modified wetpressed tissuemaking process. In a typical process a low consistency pulp furnish is provided in a pressurized headbox. The headbox has an opening for delivering a thin deposit of pulp furnish onto a formaninous forming fabric to form a wet web. The web is then typically dewatered to a fiber consistency of about 30% to 40% (total web weight basis) by a noncompressive dewatering means such as an air press. The term "noncompressive dewatering" refers to dewatering methods that do not involve compressive nips or other steps causing significant densification or compression of a portion of the web during the dewatering process. The dewatered web is then transferred to a molding fabric. The molded and dewatered web is then pressed against the surface of a heated drying cylinder, such as a Yankee dryer, to dry the web. The web may optionally be creped. In the case of a creped web, the web is adhered to the heated drying cylinder by the pressing forces and adhesive. When the web is dry it is scraped from the Yankee dryer with a doctor blade. Creping shortens and softens the resulting web. MWP webs are considered to be generally noncompacted since the web is compressed only at the knuckles of the molding fabric, resulting in large noncompressed areas and a bulkier web. MWP webs also tend to be resilient because structure is molded into webs before they are dried.

MWP plies used in the examples were produced with an Appleton Brand Wire T216-3A molding fabric. Basis weight was about 10.25 lbs/2880 ft$^2$ and geometric mean tensile was about 1470 grams/3-inches (measured as 2-plies).

UCTAD

The term UCTAD refers to an uncreped through air dried tissuemaking process. Through air dried is sometimes abbreviated simply as "TAD". In a typical process, a low consistency pulp furnish is provided in a pressurized headbox. The headbox has an opening for delivering a thin deposit of pulp furnish onto a foraminous forming fabric to form a wet web. The web is then typically dewatered to a fiber consistency of between about 7% and about 25% (total web weight basis) by vacuum dewatering. The wet web is then transferred to a transfer fabric which is typically traveling at a speed 20% to 40% slower than the forming fabric. This imparts machine direction stretch to the finished web. The web is then transferred to a throughdryer/molding fabric. The web is then simultaneously dried by one or more through air dryers and molded to the surface conformation of the fabric. The dried web is then wound into rolls for converting into product. UCTAD webs are considered to be non-compacted since the web is subjected to minimal mechanical compressional forces while the fibers are moist, and the web is dried by a non-compressive means. UCTAD webs tend to be bulkier and more resilient than CWP webs.

UCTAD plies used in the examples were produced with an Appleton Brand Wire T1205-1 throughdryer/molding fabric. Basis weight was about 11 lbs/2880 ft$^2$, geometric mean tensile was about 1000 grams/3-inches (measured as 2 plies), and caliper was about 0.0020-inch (measured as 2 plies).

Fabricless TAD

It is possible to form a through air dried tissue (TAD) without employing a forming fabric. When such a process is employed, it is deemed or called "fabricless TAD".

Example 1

A multi-ply tissue is provided having a first outer ply of CTEC and a second outer ply of CWP. Furthermore, the middle ply is provided using an uncreped through air dried tissue (UCTAD). To denote tissues in the following examples, the abbreviation or designations will read from left to right, from one outer ply to another outer ply, as such:
CWP/UCTAD/CWP, which denotes CWP as a first outer ply, UCTAD as a middle ply, and another CWP as the second outer ply.

Example 2

In this example, a three ply tissue is manufactured as above described, except that the three layer structure comprises: UCTAD/CWP/UCTAD.

Example 3

In this example, a three ply tissue is manufactured as above described, except that the three layer structure comprises: MWP/CWP/MWP.

Example 4

In this example, a three ply tissue is manufactured as above described, except that the three layer structure comprises: CWP/MWP/MWP.

Example 5

In this example, a three ply tissue is manufactured as above described, except that the three layer structure comprises: Fabricless TAD/CWP/Fabricless TAD.

Example 6

In this example, a three ply tissue is manufactured as provided as described, except that the three layer structure comprises:
CWP/Fabricless TAD/CWP.

Example 7

In this example, a three ply tissue is made so as to provide a three layer structure comprising:
MWP/UCTAD/MWP.

Example 8

Prototype three ply tissues were printed with a lotion formulation having the following properties:

| Ingredient | Approximate Percentage (%) |
| --- | --- |
| Prolipid 141 (International Specialty Products | 2.00 |
| Avocado oil (Alnoroil) | 2.00 |
| Soya sterol | 0.80 |
| Vitamin E acetate (Roche) | 0.30 |
| Petrolatum (Ultra Chemical) | 8.00 |
| Propylene glycol | 30.80 |
| Glycerin | 5.00 |
| Aloe vera powder (Terry labs) | 0.10 |
| PEG 8000 (Union Carbide) | 20.00 |
| Behenyl alcohol (Glenn Chemical) | 10.00 |
| Stearyl alcohol (Glenn Chemical) | 10.00 |
| Dimethicone 100 Cst (Dow Corning) | 10.00 |
| DC 1428 (Dow Corning) | 1.00 |

Linespeed was about 1500 ft/minute, processing temperature was about 140° F., and the gravure rolls were 5.4 cbm/1.5 cbm striped rolls. Target add-on was 8% based on the weight of the treated tissue. Offset printing was employed.

Example 9

The formulation of Example 8 was employed in preparing the Examples 9 and 10.
UCTAD/CWP/UCTAD
This prototype has relatively low GMT, but is thick and heavy with an evident lotiony feel.

Example 10

The formulation of Example 7 was used, also employing the following structure:
CWP/UCTAD/CWP
This prototype has relatively low GMT, but is thick and heavy, with an evident lotiony feel. The combination of out-facing smooth plies with internal cushion is quite different from 3-ply CWP product. Properties of this 3 ply tissue were as follows:
Basis Weight: 28.8 lb/2880 ft2
Caliper: 0.012 inches
GMT: 691 grams/3-inches These and other modifications and variations to the present invention may be practiced by those of ordinary skill in the art without departing from the spirit and scope of the invention. The invention is particularly set forth in the appended claims. Further, it should be understood that aspects of the various embodiments disclosed in this specification may be interchanged both in whole or in part, without departing from the invention. Furthermore, those of ordinary skill in the art will appreciate that this description is by way of example only, and is not intended to limit the invention as described in the claims.

What is claimed is:

1. A composite tissue structure comprising:
a permeable first outer web containing pulp fibers, the first outer web comprising a conventional wet pressed tissue web;
at least one middle web containing pulp fibers, the at least one middle web comprising a modified wet pressed tissue web;
a permeable second outer web containing pulp fibers, the second outer web comprising a modified wet pressed tissue web, the middle web being positioned in between the first and second outer webs; and
wherein the middle web has a thickness greater than the thickness of either the first or the second outer web, the middle web also having a bulk that is greater than the bulk of either the first or second outer web.

2. A composite tissue structure as defined in claim 1, wherein the middle web has a thickness of from about 0.01 cm to about 1 cm.

3. A composite tissue structure as defined in claim 1, wherein the middle web has a thickness that is at least 1.3 times greater than the thickness of the first outer web and that is at least 1.3 times greater than the thickness of the second outer web.

4. A composite tissue structure as defined in claim 1, wherein the first outer web has been treated with a creping adhesive.

5. A composite tissue structure comprising:
a permeable first outer web containing pulp fibers, the first outer web comprising a creped web;
at least one middle web containing pulp fibers, the middle web comprising a creped web, the middle web additionally comprising an absorbent foam;
a permeable second outer web containing pulp fibers, the second outer web comprising a creped web, the middle web being positioned in between the first and second outer webs;
wherein the middle web has a thickness greater than the thickness of the first outer web and greater than the thickness of the second outer web, the middle web having a bulk that is also greater than the bulk of the first outer web and greater than the bulk of the second outer web; and
wherein at least one of the permeable first outer web, the at least one middle web, or the permeable second outer web comprises a modified wet pressed tissue web.

6. A composite tissue structure as defined in claim 5, wherein the foam comprises a polyurethane.

7. A composite tissue structure as defined in claim 5, wherein the foam comprises a high internal phase emulsion foam.

8. A composite tissue structure as defined in claim 5, wherein the middle web has a thickness that is at least 1.3 times greater than the thickness of the first outer web and that is at least 1.3 times greater than the thickness of the second outer web.

9. A composite tissue structure comprising;
a permeable first outer web containing pulp fibers, the first outer web comprising a creped web;
at least one middle web containing pulp fibers, the middle web comprising a creped web, the middle web additionally comprising activated carbon;
a permeable second outer web containing pulp fibers, the second outer web comprising a creped web, the middle web being positioned in between the first and second outer webs;
wherein the middle web has a thickness greater than the thickness of the first outer web and greater than the thickness of the second outer web, the middle web having a bulk that is also greater than the bulk of the first outer web and greater than the bulk of the second outer web; and
wherein at least one of the permeable first outer web, the at least one middle web, or the permeable second outer web comprises a modified wet pressed tissue web.

10. A composite tissue structure as defined in claim 9, wherein the middle web has a thickness that is at least 1.3 times greater than the thickness of the first outer web and that is at least 1.3 times greater than the thickness of the second outer web.

11. A composite tissue structure as defined in claim 9, wherein the middle web has thickness of from about 0.01 cm to about 1 cm.

12. A composite tissue structure comprising:
a permeable first outer web containing pulp fibers;
at least one middle web, the middle web comprising a coform web, the coform web comprising a mixture of meltblown thermoplastic fibers and pulp fibers;
a permeable second outer web containing pulp fibers, the middle web being positioned between the first and second outer webs;
wherein the middle web has a thickness greater than the thickness of the first outer web and greater than the thickness of the second outer web; and
wherein at least one of the permeable first outer web, the at least one middle web, or the permeable second outer web comprises a modified wet pressed tissue web.

13. A composite tissue structure as defined in claim 12, wherein the first outer web and the second outer web comprise creped webs.

14. A composite tissue structure as defined in claim 12, wherein the coform web contains from about 50% by weight pulp fibers to about 65% by weight pulp fibers.

\* \* \* \* \*